Patented Dec. 20, 1938

2,140,989

UNITED STATES PATENT OFFICE

2,140,989

MOLECULAR COMPOUNDS AND A PROCESS OF PREPARING THEM

Josef Eisenbrand and Max Sienz, Frankfort-on-the-Main, Germany, assignors to Winthrop Chemical Company, Inc., New York, N. Y., a corporation of New York No Drawing. Application July 21, 1937, Serial No. 154,936. In Germany July 30, 1936

5 Claims. (Cl. 260—284)

The present invention relates to molecular compounds and to a process of preparing them.

We have found that ascorbic acid and iso-ascorbic acid are capable of forming molecular compounds with quinine or quinidine. The process of making these compounds may consist in dissolving ascorbic acid or iso-ascorbic acid in a suitable solvent and precipitating the molecular compound. Or the salts, for instance the sodium compound of the ascorbic acid or iso-ascorbic acid, may be caused to react with quinine salts or quinidine salts during which process the salts obtained as by-products have to be eliminated. The acids named are capable of forming with the bases named molecular compounds in the proportion of 1:1 and 2:1. Correspondingly during the preparation of the molecular compounds the acid component is used in a single or double molecular proportion calculated upon the quantity of the base used. For preserving purposes an excess of the acid component may be applied.

The molecular compounds obtained in this manner are distinguished from the components by increased solubility, especially in water, and by an especially good pharmacologic action. They form yellow crystals which melt with decomposition at about 90° C. to about 120° C.

It is known that the stability of the adrenaline may be increased by the addition of ascorbic acid to a dilute solution of adrenaline. The possibility of the formation of molecular compounds of the kind here described could however not be deduced from that knowledge.

Emphasis must be laid upon the great stability of the molecular compounds in an aqueous solution which is surprising in view of the known hydrolytic splitting of most of organic molecular compounds in water. Furthermore the solubility in water which amounts to 60 per cent is surprisingly great; it permits the preparation of solutions of an especially high concentration. Finally aqueous solution of the molecular compounds of this invention, if they are dissolved in water, have pH-values which allow the use of the solution for injecting purposes without the danger that detrimental physiological actions occur.

The following examples serve to illustrate the invention but they are not intended to limit it thereto:

1. 1.62 grams of quinine base or quinidine base respectively are added to a solution of 1.78 grams of ascorbic acid in 50 cc. of water. The bases readily dissolve and yellow solutions are obtained. These solutions may directly be used or the molecular compounds may be obtained therefrom in a solid form by concentrating the solutions with application of an indifferent gas such as nitrogen. The compounds form yellow hydrous crystals which melt with decomposition at about 91° C.

2. An intimate mixture of 1.62 grams of quinine base and 1.78 grams of ascorbic acid is heated in a nitrogen atmosphere on an oil bath to about 125° C. until the whole has just melted. The yellow molecular compounds are obtained. Also in this case an excess of ascorbic acid may be used for preserving purposes.

3. A solution of 3.24 grams of quinine base or quinidine base in 10 cc. of $n/1$ hydrochloric acid is added to a solution of 1.89 grams of the sodium salt of ascorbic acid or iso-ascorbic acid in 10 cc. of water and the whole is evaporated to dryness under reduced pressure at ordinary temperature. The dry residue is extracted with alcohol and the corresponding compound is separated by concentration.

4. 4.9 grams of the barium salt of ascorbic acid are dissolved in 50 cc. of boiled distilled water while nitrogen is passed through. A solution of 8.9 grams of quinine sulfate in 250 grams of hot boiled distilled water is added and the whole is immediately cooled. After cooling the precipitate obtained is vigorously centrifuged. The decanted clear solution is concentrated under reduced pressure. The molecular compound is obtained in the form of a dry powder.

In the same manner and in the same quantitative proportions there may be used instead of quinine sulfate quinidine sulfate and instead of the barium salt of ascorbic acid the barium salt of iso-ascorbic acid.

We claim:

1. The process which comprises causing an acid selected from the group consisting of ascorbic acid and iso-ascorbic acid to react with a base selected from the group consisting of quinine and quinidine.

2. The process which comprises causing a salt of an acid selected from the group consisting of ascorbic acid and iso-ascorbic acid to react with a salt of a base selected from the group consisting of quinine and quinidine.

3. The process which comprises causing 1 mol of an acid selected from the group consisting of ascorbic acid and iso-ascorbic acid to react with 1 mol of a base selected from the group consisting of quinine and quinidine.

4. The process which comprises causing 2 mols of an acid selected from the group consisting of ascorbic acid and iso-ascorbic acid to react with 1 mol of a base selected from the group consisting of quinine and quinidine.

5. Molecular compounds of an acid selected from the group consistng of ascorbic acid and iso-ascorbic acid, and of a base selected from the group consisting of quinine and quinidine, said molecular compounds forming yellow crystals readily soluble in water and melting with decomposition at about 90° C. to about 120° C.

JOSEF EISENBRAND.
MAX SIENZ.